(12) United States Patent
Kurupacheril et al.

(10) Patent No.: US 8,774,596 B2
(45) Date of Patent: Jul. 8, 2014

(54) CONTEXT DRIVEN VIDEO PRIORITIZATION AND BOOKMARKING

(71) Applicant: Futurewei Technologies, Inc., Plano, TX (US)

(72) Inventors: Francis Kurupacheril, Cupertino, CA (US); Dennis Episkopos, Westminster, CO (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 13/709,585

(22) Filed: Dec. 10, 2012

(65) Prior Publication Data

US 2014/0161417 A1 Jun. 12, 2014

(51) Int. Cl.
*H04N 9/80* (2006.01)
(52) U.S. Cl.
USPC .......................................................... 386/241
(58) Field of Classification Search
USPC ................................. 386/200, 241
See application file for complete search history.

(56) References Cited

U.S. PATENT DOCUMENTS

| | | | |
|---|---|---|---|
| 2002/0184622 A1* | 12/2002 | Emura et al. | 725/34 |
| 2007/0036522 A1* | 2/2007 | Yoshida et al. | 386/96 |
| 2010/0156911 A1* | 6/2010 | Zhao et al. | 345/474 |
| 2010/0312770 A1* | 12/2010 | Smith-Semedo et al. | 707/741 |
| 2012/0210231 A1* | 8/2012 | Ubillos et al. | 715/723 |
| 2012/0215630 A1* | 8/2012 | Surendran et al. | 705/14.49 |
| 2013/0198770 A1* | 8/2013 | Xiong et al. | 725/25 |

* cited by examiner

*Primary Examiner* — Huy T Nguyen
(74) *Attorney, Agent, or Firm* — Conley Rose, P.C.; Grant Rodolph; Rayhao A. Chung

(57) ABSTRACT

An apparatus to automatically prioritize and divide a video into a plurality of video segments for a user, wherein the apparatus comprises a processor configured to, obtain a plurality of video content data that describes the content within the video, display the video in a viewable format for the user, receive at least one keyword from a search field, wherein the keyword indicates the type of video content data the user is searching for, search through the video content data using the keyword, divide the video into the plurality of video segments using the keyword, prioritize the video segments using the keyword, and display the prioritize video segments in a priority list.

20 Claims, 4 Drawing Sheets

CONTEXT DRIVEN VIDEO PRIORITIZATION AND BOOKMARKING

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An enterprise unified communication (UC) system is an evolving set of technologies that automates and unifies communication in a common context and experience via a modern network. The UC system integrates real-time communication services such as video conferencing, instant messaging, and telephony, with non-real-time communication services such as email, voicemail, and fax. An UC system may be a single product solution or set of products that provide a consistent unified user interface and user experience across multiple devices and media types. The UC system may allow an individual to send a message on one medium (e.g. voicemail) and receive the same communication on another medium (e.g. instant message). As modern networks and data network continue to mature, UC systems may become more widely used to exchange many different forms of communications.

Real time streaming, recording, and playback of videos have become more and more prevalent in UC systems. However, viewing videos have historically been a passive experience between a user and the viewing interface. For instance, a user may typically push a play button to view an entire video to discover relevant content that interests the user. The time spent viewing an entire video may amount to countless hours of unproductive and wasted time viewing material not pertinent to the user. Moreover, constant video streaming by multiple users may place a heavy burden on the network infrastructure of the UC system. Thus, improvements have been made to improve the efficiency of the viewing experience.

A user may avoid re-watching an entire video or randomly predict the location of relevant clips by bookmarking relevant segments of the video during the viewing process. The bookmarks may enable a user to playback and save the relevant segments for viewing at a later date. Moreover, users may use bookmarks generated by an administrator to track, playback, and direct a user to relevant sections of a video. The administrator may attempt to set bookmarks where the administrator believes to be important junctures of a video. An example of administrator bookmarks are the different chapters used to divide a movie encoded on a blue-ray disc or digital video disc (DVD). Although improvements have been for users to effectively view videos, the improvements fall short in providing a user an interactive interface that automatically prioritizes and bookmarks videos in real-time, and thus maximizes a user's time and reduces data traffic over a network infrastructure.

SUMMARY

In one embodiment, the disclosure includes an apparatus to automatically prioritize and divide a video into a plurality of video segments for a user, wherein the apparatus comprises a processor configured to obtain a plurality of video content data that describes the content within the video, display the video in a viewable format for the user, receive at least one keyword from a search field, wherein the keyword indicates the type of video content data the user is searching for, search through the video content data using the keyword, divide the video into the plurality of video segments using the keyword, prioritize the video segments using the keyword, and display the prioritize video segments in a priority list.

In yet another embodiment, the disclosure includes a video-user interface that prioritizes and bookmarks a video for a user, wherein the video-user interface comprises a viewing window that projects the video images, a timeline bar placed on the bottom segment of the viewing window, wherein the timeline bar tracks the total time for the video playing in the viewing window, and a bookmark indicator affixed to the top of the timeline, wherein the bookmark indicator is generated and affixed to the timeline bar when the user repeatedly plays a portion of the video more than once.

In a third embodiment, the disclosure includes a method for automatically dividing and prioritizing a video for a user, the method comprising storing the context information of a video, wherein the context information indicates the video information within the video in a text format, receiving at least one search term into a search box from the user, searching the context information of a video using the search term, dividing the video into a plurality of video segments, prioritizing the plurality of video segments, presenting the video segments in a priority list, wherein the video segments with higher priorities are placed at the beginning of the list, receiving at least one new search terms in the search box by the user after the video segments have been prioritized, modifying the priorities of the video segments in the priority list after at least one new search terms is entered into the search box by the user, updating the priority list using the modified priorities of the video segments, and bookmarking the search term and the new search term when the search term and the new search term are the same.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Disclosed herein is a method and system to automatically prioritize video segments and generate contextually useful video bookmarks for a user. A video storage unit may store video context information that may be used to modify the viewing of a recorded or real-time video transmission. Initially, the video may be contextually modified to display segments of the video using a priority list based on a user context database and/or user context settings. The initial priority list may be modified by the user by entering keywords or phrases into a search field to search through the video context information. The context database may search through the video context information to discover relevant context information and adjust the priority list in real-time. The priority list may be configured by an "opt-in" setting that returns a set number of video clips most relevant to the keywords entered into the search field. Additionally when the user repeatedly searches for a particular segment of a video or repeatedly playbacks a segment of the video, a content tag and bookmark may be automatically generated that adjusts the priority list in real-time.

Figure 1:
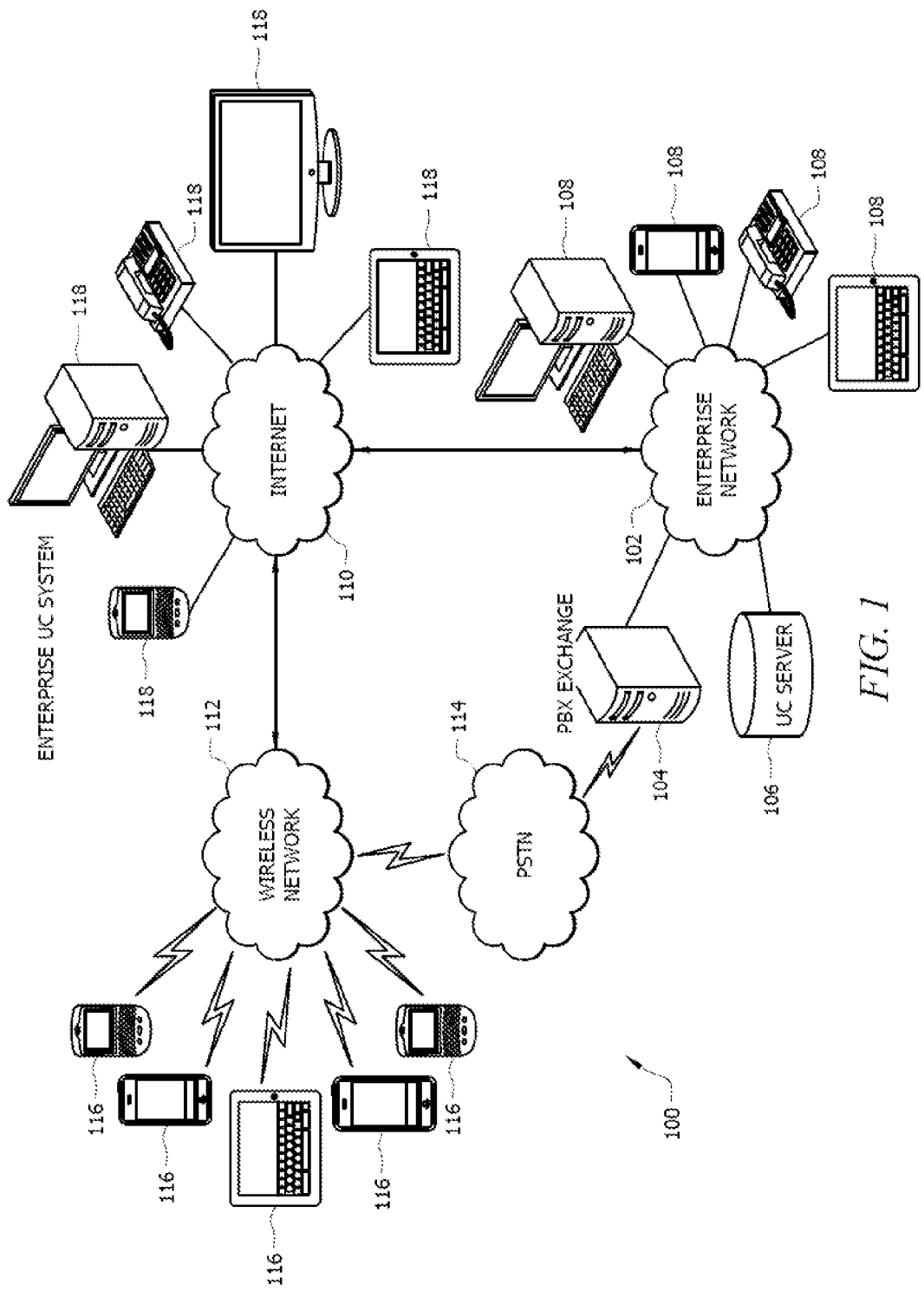
FIG. 1 is a schematic diagram of an embodiment of a UC system that automatically prioritizes and bookmarks a video.

FIG. 1 is a schematic diagram of an embodiment of a UC system 100 that automatically prioritizes and bookmarks a video. The UC system 100 may comprise an enterprise network 102, the Internet 110, and a wireless network 112. As shown in FIG. 1, the wireless network 112 and enterprise network 102 may be coupled to the Internet 110. The Internet 110 may include, but is not limited to hard-wired networks, wireless networks, and virtual networks that may operate in the electrical and/or optical domains. The networks within Internet 110 may comprise a wide variety of telecommunication nodes such as routers, servers, and bridges. Wireless network 112 may be a telecommunication wireless network, such as a wireless fidelity (Wi-Fi) or cellular network, where two or more mobile endpoints 116 may communicate with each other without being physically connected. The wireless network 112 may be coupled to a public switch telephone network (PSTN) 114. The PSTN 114 may comprise telephone lines, fiber optic cables, microwave transmission links, and other network equipment necessary to provide telephone exchanges.

The enterprise network 102 may be a private network and may not be publicly accessed, such as the wireless network 112 or the Internet 110. The enterprise network 102 may be any type of network that transports data, such as Internet Protocol (IP), Multiprotocol Label Switching (MPLS), and Ethernet networks. The enterprise network 102 may be a network comprising one or more local area networks (LANs) and/or virtual networks. The enterprise network 102 may be coupled to one or more UC servers 106, a private branch exchange (PBX) exchange, and numerous UC endpoints 108. The UC servers 106 may include, but are not limited to, hosts, servers, storage devices or other types of devices that may originate data into or receive data from the enterprise network 102. The UC servers 106 may integrate and manage real-time communication services (e.g. voice over Internet Protocol (VoIP) telephony, instant messaging, and audio conferencing), and non-real time communication services (e.g. voice mail, email, and fax) used by the UC endpoints 108. The enterprise network 102 may be configured to support a PBX exchange 104 that is coupled to a public switch telephone network (PSTN) 114. The PBX exchange 104 may provide telephone connections among UC endpoints 108 within the enterprise network 102. The UC endpoints 108 may encompass a variety of devices, such as personal computers, telephones, cellular phones, video imaging/conferencing equipment, IP devices, and/or video-audio devices (e.g. televisions).

The UC endpoints 108 may access a video via the enterprise network 102, a component of the UC endpoint (e.g. internal memory device) or externally coupled removable media (e.g. DVD player and universal serial bus (USB) flash drives) using a web browser application (e.g. Internet Explorer) or some other video-user interface. Videos accessible through the web browser application or video-user interface may include embedded streaming video, webcasts, podcasts, Internet protocol television, and/or other Internet based video. The video may have been previously stored or recorded on a video storage unit, embedded into a web page, and/or a live stream originating from a UC endpoint 108, mobile endpoint 116, and/or remote endpoint 118. Other embodiments of the UC system 100 may be configured to provide video to UC endpoints 108 via television broadcast, such as airwave broadcast, cable broadcast, and/or satellite broadcast.

The wireless network 112 may be coupled to a plurality of mobile endpoints 116. The mobile endpoints 116 may encompass a variety of devices, such as personal computers, telephones, cellular phones, video imaging/conferencing equipment, IP devices, and/or video-audio devices (e.g. tablet devices). Video may be forwarded from the wireless network 112 to multiple mobile endpoints 116 or vice versa. In addition to coupling with the wireless network 112 and the enterprise network 102, the Internet 110 may also be coupled to a plurality of remote endpoints 116 that may encompass a variety of devices similar to UC endpoints 108. Remote endpoints 116 may be devices associated with a network operated by a third-party, and thus may not be associated with the enterprise network 102.

Both remote endpoints 116 and mobile endpoints 116 may be configured to access the enterprise network 102 using a virtual network, such as virtual private network (VPN). Once the connection is established, a video may be forwarded from the enterprise network 102 through the Internet 110 to reach remote endpoints 118 and mobile endpoints 116. Additionally, mobile endpoints 116 and remote endpoints 118 may generate and/or encode video and forward the video to enterprise network 102 via the Internet 110. Mobile endpoints 116 and remote endpoints 118 may also access video through a component storage device and/or an externally coupled removable media similar to UC endpoints 108.

Figure 2:
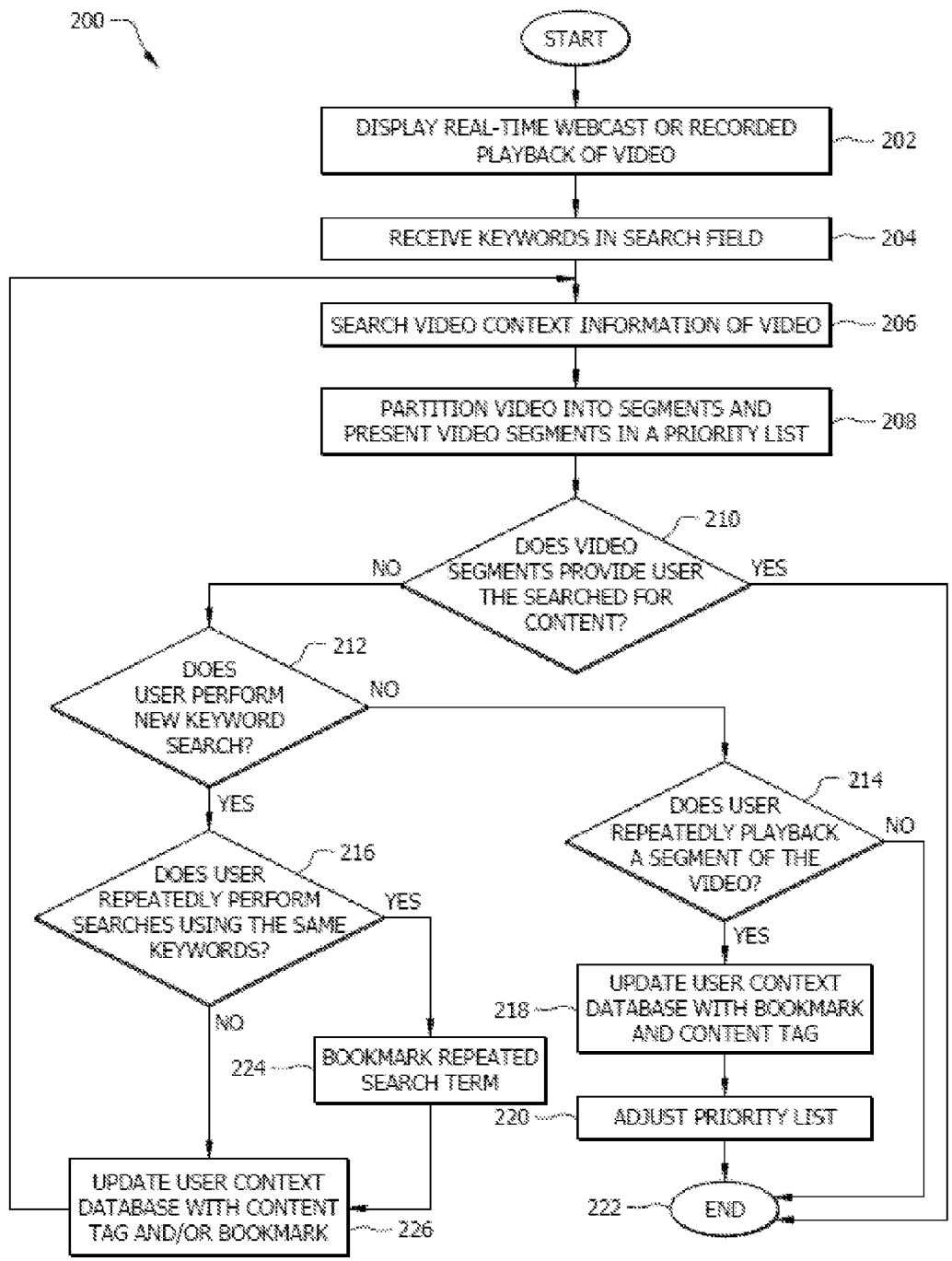
FIG. 2 is a flowchart of an embodiment of a method that automatically prioritizes video segments and generates video bookmarks for a user during a recorded playback or real-time streaming of a video.

FIG. 2 is a flowchart of an embodiment of a method 200 that automatically prioritizes video segments and generates video bookmarks for a user during a recorded playback or real-time streaming of a video. Method 200 may start at block 202 where the video-user interface displays the video on a device (e.g. UC endpoints 108, remote endpoints 118, or mobile endpoints 116). When the video is a webcast, podcast, or other real-time streaming video, block 202 may simultaneously store video content information in a video storage unit while the user streams the video. The video storage unit may be any device able to store video content information. Using FIG. 1 as an example, the video storage unit may be a UC server 106, UC endpoints 108, remote endpoints 118, and/or mobile endpoints 116. Additionally, the video storage unit may be the device operating the video-user interface and displaying the video to the user. During a video playback or a viewing of a recorded video, the video storage unit may have already stored the video content information at the time a user views the video.

The video content information may be embedded within the video and may include, but is not limited to metadata, video information, text information (e.g. closed captioning information), audio information, and any other context information used to describe a video frame. Video information may include images, settings, people, and objects within the video. Audio information may include speech, music, and background sounds within the video. Persons of ordinary skill in the art are aware of a number of methods and algorithms to create, encode, and extract video context information from a video and covert the information into a searchable text format.

When the user initially accesses the video at block 202, a video may initially be indexed, divided, and prioritized into a plurality of video segments based on a user context database and/or user context settings. A user context database may be created using user context information, such as previous search history, user defined preferences, content tags, and bookmarks generated for a particular user. The user context information may also comprise various voice, text, and video communication modes that may suggest a particular user's video preferences. The user context database may prioritize video segments most relevant to the particular user. The user context database may obtain user context information for one or more users and/or one or more different video-user interfaces. The user context database may be stored in a variety of devices, such as a UC server 106, UC endpoints, remote endpoints 118, and/or mobile endpoints 116 shown in FIG. 1. Another embodiment may have the user context database stored in a cloud structure. The user context database also may be stored in the device operating the video-user interface and/or storing the video content information.

In one embodiment of block 202, a sophisticated search engine, such as the GOOGLE search engine, and/or an enterprise specific search and query engine may operate in the background of the video-user interface. The search engine may provide the user context database web browsing history, cookies, email content, and other available Internet search data to initially index, divide, and prioritize a video. For example, a user may have recently performed multiple searches within the search engine in regards to a particular football player. The user may be watching a football video in the video-user interface in which the particular football player is participating in. In such an instance, the search engine may provide user context information to the user context database to prioritize the football video based on the football player. The search engine may generate its user context information form searches done in the video-user interface, a web browser, or other interface that uses the search engine.

A user may be able to adjust the user context settings to also affect the initial indexing and prioritization of the video within the video-user interface. The user context setting may be a setting preference or options within the video-user interface that affect how the video is prioritized, indexed, and viewed by the user. Examples of user context settings may include: whether to index the entire video, the time duration of video segments, the number of video segments return, and other settings that may affect a user's viewing experience. For example, the user context setting may be adjusted to index the entire video to produce a plurality of video segments about five minutes long. When an entire video is indexed, no frames from the video are lost and the user may access the entire video from the different video segments shown in the priority list. Alternatively, the user may a select an "opt-in" setting within the user context setting. The "opt-in" setting may index and prioritize only the most relevant video segments. For example, the user may decide to only show the top three video segments and set the time duration for a video segment to about five minutes long. With this particular example, the "opt-in" setting may exclude and not process the other sections of the video that are not part of the top three video segments. Consequently, the user may not be able to access all of the video using the "opt-in" setting. Other time durations and the number of video segments displayed may be set by the user in addition to the example shown above.

Method 200 may then proceed to block 204 where the device operating the video-user interface may receive one or more keywords entered by the user in a search field. The keywords may be entered by typing text into the search field or selected from a list of keywords. The keywords may describe the attributes or sections of the video that interest a user. Keywords entered into the search field may be a string of characters that form texts, Boolean operators (e.g. AND/OR functions), and other special characters that are well known in the art (e.g. quotations and asterisk). A video-user interface may use the keywords to create one or more content tags based on the keywords entered into the search field. A content tag may be created for each keyword and/or a combination of keywords. For example, a user may enter the keywords "longhorn touchdown" into the search field. The video-user interface may generate a content tag for "longhorn," a separate content tag for "touchdown," and another content tag for "longhorn touchdown." Additionally, different types of content tags may be created for a keyword that may normalize the keyword differently. Normalizing the content tag may help describe the keyword or categorize the keyword. For example, a content tag may label or associate the text "touchdown" as a generic text tag, a key event tag, and/or timeline tag. The generated content tag may then be sent to update the user context database. Use of content tags to search, index, divide, and prioritize a video will be discussed in more detail below.

After a user enters keywords into a search field, the method 200 continues to block 206 to search video content information. At block 206, the user context database may be used to search the video content information from the video. As discussed earlier, the video content information may decode video and audio information in a video into a text format. For example, video information may be converted into a text format using pattern recognition algorithms for images, settings, people, objects, human gestures, texts and any other video information within a video. Speech recognition software may be used to convert spoken words into text. Thus, the text generated may textually describe the video and audio information. The user context database may then search through the video content information to match the keywords and content tags with the text information. In one embodiment, the device operating the video-user interface may comprise the video storage unit and the user context data base, while other embodiments may have the video storage unit, the device operating the video-user interface, and/or the user context database on separate devices.

Once block 206 finishes searching the video content information, block 208 may divide the video into video segments and prioritize the video segments. Block 208 may divide and prioritize using keyword matches, key events, timeline chronology of the video, and other methods to prioritize a video. In a keyword matching prioritization, the user context database may search through the video content information and accumulate the number of hits or matches for keywords entered by a user. In one embodiment, block 208 may divide and prioritize the video based on the number of keyword matches for a certain amount of time. For example, a video segment that is about one minute long may have about 50 keyword matches. In other words, the video segment may have a keyword match density of 50 keywords per minute. Video segments with higher keyword match densities may be designated as higher priority video. Moreover, video segments may be created based on the keyword match density. For example, one video segment may include video segments with keyword match density of 50 keywords per minute, while a second video segment may include video segments with a keyword match density of about 51 to 100 keyword per minute. In one embodiment, the video segment may include additional video for based on a specified time before and after the keyword setup in the user context setting. For example, the video segment created with keyword match densities may include about two seconds of video before and after the video segment. Person of ordinary skill in the art are aware that other keyword match methods may be used to prioritize and segment a video.

Block 208 may also use key events to prioritize a video. For example, a user may be viewing a football game and decides to search the keyword "touchdown." The user context database may search and discover video segments that include the "keyword" touchdown. The key word matches may originate from a variety of video content sources, such as announcers using the word "touchdown" or the actual event when one of the teams score a touchdown. In one embodiment, block 208 may prioritize the actual event of a team scoring the touchdown over other video segments that match the keyword "touchdown," even if the keyword match density is higher for the other video segments. Videos may also be divided by the key events. For example, one video segment may start at the beginning of the key event and continue until another key event occurs.

Another embodiment of block 208 may prioritize video segments based on timeline chronology. Continuing with the "touchdown" example, block 208 may prioritize key events and/or keyword match densities that occur later in the football game. Block 208 may associate a higher priority for a team scoring a "touchdown" in the last two minutes of the fourth quarter than a "touchdown" event that occurred at the beginning of the game. Additionally, a user may specify a certain time in a video that may be of a particular interest to the user. For example, a user may be searching for a specific highlight moment that occurred in the second quarter. The user may enter the keyword "second quarter" into the context search engine, which may cause block 208 to prioritize key events and/or keyword matches in the second quarter over other times in the video. Block 208 may also partition the video into video segments based on the timeline chronology. Using the football game example, block 208 may divide a football game into the following video segments: the pregame show, start of the first quarter, start of the second quarter, halftime, start of the third quarter, start of the fourth quarter, and the post-game show. Additionally, block 208 may prioritize video segments based on a specified number of a key event occurrence. For example, block 208 may be to find the second touchdown of a football game when a user enters the keyword "second touchdown." The timeline chronology and specified number of a key event attributes may be combined to prioritize video segments.

One embodiment of block 208 may automatically index and prioritize a real-time transmission of a video based on keywords received in the search field from block 204. For example, a user may input keywords "lead changes" that represents a key event for a real-time transmission of a football game. Block 208 may initially prioritize the football game using the current available or streamed video. As the game progresses and transmission of the football game continues, a team may eventually score a touchdown or a field goal that changes which team leads in the football game. In such a case, block 208 may automatically update the priority of the video segments that includes the new "lead change." Block 208 may also automatically reprioritize based on keyword matches, timeline chronology, and/or other methods used to prioritize a video.

The sophisticated search engine and/or enterprise specific search and query engine may alter the indexing and prioritization of a video at block 208. The search engine may operate in the background of the video-user interface, and may aggregate prior search data to prioritize a video. The user may have previously entered keyword searches pertaining to the team and a particular player in the video-user interface or another search engine. The search engine may have stored and learned the user's team and player preference and provide user content information to relate to keywords entered into the search field. For example, a user may be a dedicated supporter of a particular football team and a particular football player. When a user enters the word "touchdown," the search engine may relate the word "touchdown" to the football team and/or player. The user context database may then use the user context information from the search engine to prioritize video where the particular team and/or football player scores a touchdown. After block 208 finishes prioritizing the video segments, block 208 may present the indexed video segments in a priority list. The first video segment presented in the list may have the most priority, while the last video segment presented may have the lowest priority.

From block 208, the method 200 moves to block 210 to determine whether any of the video segments presented pertain to the user. At block 210, the user may view the priority list and watch portions of the video segments to decide that one of the video segments in the priority list matches the searched for video section. When the user is able to find the video section, then method 200 progresses to block 222 and ends. However, if the user is unable to find the correct video section, method 200 may continue to block 212. At block 212, method 200 determines whether the user decided to perform another search by entering a new set of keywords into the search field. For example, a user may initially perform a search using keyword "touchdown. If the user performs another search, the method 200 proceeds to block 216.

A block 216, method 200 determines whether repeated searches have been performed using the same key words. For example, a user may initially perform a search using the keyword "touchdown" to search a football game. The user may decide to view touchdowns that occur later in the game and subsequently may search "fourth quarter touchdown" to reprioritize the priority list. The user may then perform a third search using the keywords "longhorn fourth quarter touchdown" to find the particular video. In each of these searches, the method 200 receives the keyword "touchdown." Method 200 may proceed to block 224 to automatically generate bookmarks for the same keywords searched by method 200. Afterwards method 200 may continue from block 224 to block 226. If method 200 receives different keywords, then method 200 may proceed from block 216 to block 226. At block 226, new search terms are received, and the user context database may be updated with one or more new content tags and/or bookmarks. The content tag may be similar to the content tag discussed in block 204. Bookmarks will be discussed in more detail below. After the user context database is updated, the method 200 loops back to block 206.

Referring back to block 212, if the user decides not to perform another search, then the method 200 progresses to block 214. At block 214, the method 200 determines whether the user is repeatedly playing back. Instead of performing a new search, the user may decide to randomly look for the correct video. When the user finds the relevant section of a video, the user may repeatedly playback the same section of the video. When the user fails to repeatedly playback any sections of the video, the method 200 moves to block 222 and ends. If a user repeatedly playbacks the same section of a video, method 200 continues to block 218 and generate one or more bookmarks and/or content tags based on the video content information for the section of the video. For example, a user may repeatedly playback a football team scoring a touchdown. A bookmark may be automatically created to indicate the timeline location of the touchdown. Furthermore, a plurality of content tags, such as a "touchdown" content tag, "the name of the player that scored the touchdown" content tag, "the name of the player that threw the football" content tag, "the name of the team that scored" content tag, etc., may be generated to update the user context database. The content tags generated are similar to the content tags generated for block 204. The bookmark and content tags are sent to the user context database to update it. Afterwards method 200 proceeds to block 220 to index and adjust the priority list. Adjusting the priority list may be implemented similar to block 208.

Figure 3:
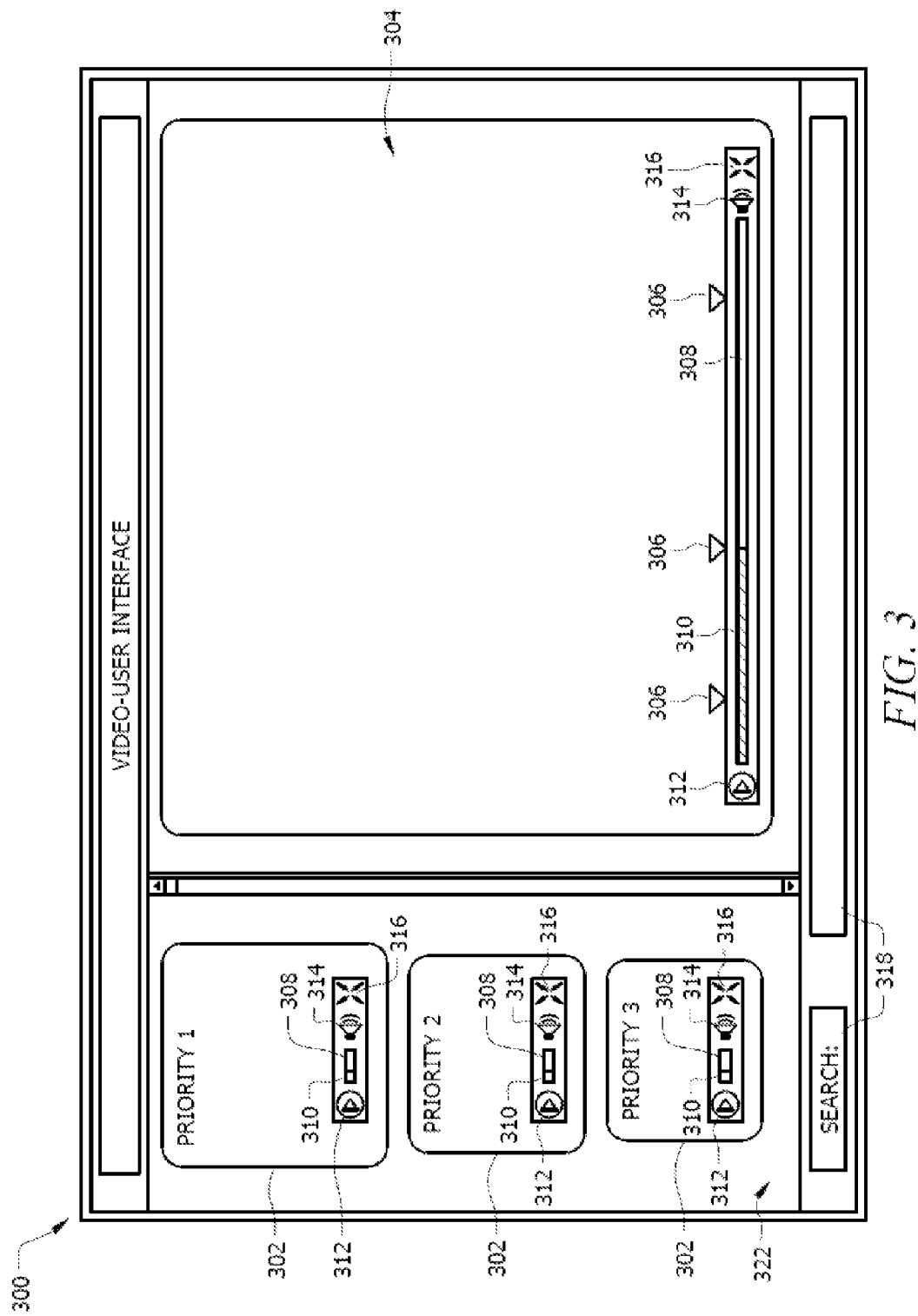
FIG. 3 is a schematic diagram of an embodiment of a video-user interface.

FIG. 3 is a schematic diagram of an embodiment of a video-user interface 300. The video-user interface 300 may comprise a plurality of video segments 302, a viewing window 304, a search field 318, and prioritization window 322. The viewing window 304 may comprise a plurality of bookmarks 306, a time display bar 308, a play option 312, a volume adjuster 314, and a screen window size option 316. A user may use the volume adjuster 314 and a screen widow size option 316 to adjust the viewing environment. For example, the user may adjust the volume adjuster 314 to adjust the sound level, and use the screen window size option 316 to adjust the size of the window display. For a user to begin viewing a video within the viewing window 304, the user may select one of the video segments 302 in the prioritization window 322 to view. In one embodiment, the window size of the video segments 302 may decrease in size with respect to the decrease in video segment priority. Once selecting a video segment 302, the video segment 302 may transpose itself to the viewing window 304. Thus, a user may modify the video segment 302 that a viewing window 304 may be ready to play by selecting different video segments 302.

The play option 312 within viewing window 304 may be used to start viewing the selected video segment 302. After a user selects the play option 312, a played bar 310 may slowly increases in the time display bar 308. The leading edge of the played bar 310 indicates the current time location on the time display bar 308 for the video currently being viewed by the user. The remaining section of the played bar 310 may indicate the elapsed or already viewed sections of the video. Any unfilled space by the played bar 310 may indicate to a user the time remaining or the portion of the video segments 302 that have not been viewed by the user. The user may select different locations on the time display bar 308 to jump to different portions of the video segment 302. Moreover, the user may be able to adjust the play speeds and/or view the selected video segment 302 in the forward or reverse direction. For example, the user may select to view the video twice the speed of the play option 312 speed in the reverse direction. Persons of ordinary skill in the art are aware of other speeds that may be selected to view the selected video segment 302 at different speed settings.

FIG. 3 illustrates bookmarks 306 affixed to the time display bar 308. The bookmarks 306 may be automatically created as discussed for block 218 in FIG. 2 or a user may manually create the bookmarks while viewing the video. A user may use the bookmarks affixed to the time display bar 308 as reference points in the time display bar 308 to jump to different portions of the video segment 302 by selecting locations on the time display bar 308 near the bookmark 306. Underneath the viewing window 304, a search field 308 may be used to enter keywords (e.g. typed into the searched field 308 or selected from a list of keywords) or other search characters as described in block 204 in FIG. 2.

The prioritization window 322 may display a prioritized list of video segments 302 as described in block 208 in FIG. 2. The top video segment window 302 may be the video with the most priority, while the video at the bottom of the prioritization window 322 may have the lowest priority. Each video segment window 302 within the priority list may comprise a time display bar 308, a play option 312, a volume adjuster 314, and a screen window size option 316. Each video segment 302 may be played within the prioritization window 322 by selecting the play option 312 with each video segment 302. Another embodiment of the prioritization window 322 may display a thumbnail or still video image within the video segment instead of a playable video segment window 302. Other embodiments of the prioritization window may simply display video segment information, such as the file name, date information, stored or streaming location of the video, etc.

Figure 4:
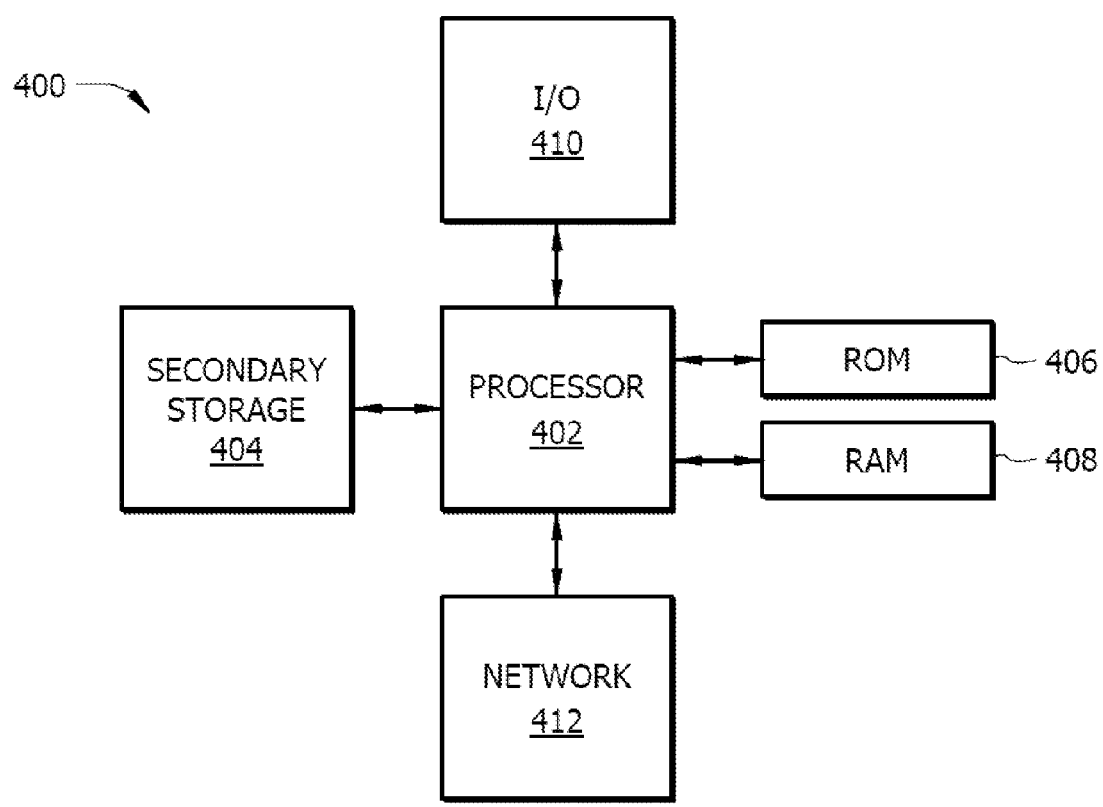
FIG. 4 is a schematic diagram of one embodiment of a general-purpose computer system suitable for implementing the several embodiments of the disclosure.

FIG. 4 illustrates a typical, general-purpose network component 400 that may correspond to or may be part of a network component, such as a server, a switch, a router, or any other network nodes. The network component 400 includes a processor 402 (which may be referred to as a central processor unit or CPU) that is in communication with memory devices including secondary storage 404, read only memory (ROM) 406, random access memory (RAM) 408, input/output (I/O) devices 410, and network connectivity devices 412. The general-purpose network component 400 may also comprise, at the processor 402 and or any of the other components of the general-purpose network component 400.

The processor 402 may be implemented as one or more CPU chips, or may be part of one or more application specific integrated circuits (ASICs) and/or digital signal processors (DSPs). The processor 402 may comprise a central processor unit or CPU. The processor 402 may be implemented as one or more CPU chips. The secondary storage 404 is typically comprised of one or more disk drives or tape drives and is used for non-volatile storage of data and as an over-flow data storage device if RAM 408 is not large enough to hold all working data. Secondary storage 404 may be used to store programs that are loaded into RAM 408 when such programs are selected for execution. The ROM 406 is used to store instructions and perhaps data that are read during program execution. ROM 406 is a non-volatile memory device that typically has a small memory capacity relative to the larger memory capacity of secondary storage 404. The RAM 408 is used to store volatile data and perhaps to store instructions. Access to both ROM 406 and RAM 408 is typically faster than to secondary storage 404.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus to automatically prioritize and divide a video into a plurality of video segments for a user, wherein the apparatus comprises:
   a processor configured to:
   obtain a plurality of video content data that describes the content within the video;
   display the video in a viewable format for the user;
   receive at least one keyword from a search field, wherein the keyword indicates the type of video content data the user is searching for;
   search through the video content data using the keyword, wherein the video content data corresponds to the video being displayed for the user;
   divide the video into the plurality of video segments using the keyword;
   prioritize the video segments using the keyword; and
   display the prioritized video segments in a priority list.

2. The apparatus of claim 1, wherein the keyword is encoded into a first content tag that categorizes the keyword, and wherein the video is divided in response to a match between the keyword and video content data for the video being displayed to the user.

3. The apparatus of claim 2, wherein the first content tag is used to prioritize the video segments.

4. The apparatus of claim 1, wherein the processor is further configured to display a set number of video segments within the priority list, wherein the set number of video segments is less than the plurality of video segments, and wherein the set number of video segments is set by the user.

5. The apparatus of claim 1, wherein the total video time of the set number of video segments is less than the total video time of the video, and wherein the set number of video segments displayed within the priority list are associated with higher priorities than the video segments not displayed in the priority list.

6. The apparatus of claim 1, wherein the video is a real-time streaming video.

7. The apparatus of claim 6, wherein the processor is further configured to obtain the video content information while streaming the real-time streaming video.

8. The apparatus of claim 1, wherein the processor is further configured to prioritize the video segments based on key events within a video segment.

9. The apparatus of claim 1, wherein the processor is further configured to bookmark the keyword when the keyword has been repeatedly used in previous searches.

10. The apparatus of claim 1, wherein the processor is further configured to generate bookmarks when the user repeatedly selects a new video segment that is different from the video segments.

11. A video-user interface that prioritizes and bookmarks a video for a user, wherein the video-user interface comprises:
    a viewing window that projects the video images;
    a timeline bar placed on the bottom segment of the viewing window, wherein the timeline bar tracks the total time for the video playing in the viewing window; and
    a bookmark indicator affixed to the top of the timeline, wherein the bookmark indicator is automatically generated and affixed by the video-user interface to the timeline bar in response to the user playing a portion of the video more than once.

12. The video-user interface of claim 11, wherein the video-user interface further comprises a user context database that indicates the user's preferences in videos, wherein the user context database is updated using the bookmark indicator, and wherein the user context database is updated using a stored bookmark that indicates a stored communication history for the user.

13. The video-user interface of claim 11, wherein the video-user interface further comprises a priority list comprising a plurality of video segments, and wherein the priority list prioritizes the video segments.

14. The video-user interface of claim 13, wherein the video-user interface further comprises a search field configured to accept a plurality of text characters, wherein the video segments are reprioritized in the priority list when the plurality of text characters are entered into the search field, and wherein the user plays the portion of the video more than once by repeatedly playing the same portion of the video.

15. A method for automatically dividing and prioritizing a video for a user, the method comprising:
   storing the context information of a video, wherein the context information indicates the video information within the video in a text format;
   receiving at least one search term into a search box from the user;
   searching the context information of a video using the search term;
   dividing the video into a plurality of video segments;
   prioritizing the plurality of video segments;
   presenting the video segments in a priority list, wherein the video segments with higher priorities are placed at the beginning of the list;
   receiving at least one new search term in the search box by the user after the video segments have been prioritized;
   modifying the priorities of the video segments in the priority list after at least one new search term is entered into the search box by the user;
   updating the priority list using the modified priorities of the video segments; and
   bookmarking the search term and the new search term when the search term and the new search term are the same.

16. The method of claim 15, wherein a bookmark is generated when the user playbacks a section of the video more than once, and wherein the bookmark saves the location of the section of the video the user playbacks.

17. The method of claim 16, wherein the priorities of the video segments are adjusted using the bookmark, wherein the video is a sports video, and wherein the bookmark indicates a lead change of the video.

18. The apparatus of claim 1, wherein the processor is configured to prioritize the video segments based on the number of keyword matches found while searching through the video content data using the keyword.

19. The apparatus of claim 1, wherein the processor is further configured to:
   receive at least one new keyword from the search field from the user after the video segments have been prioritized;
   modify the priorities of the video segments in the priority list after at least one new keyword is entered into the search field by the user;
   update the priority list using the modified priorities of the video segments; and
   bookmark the keyword and the new keyword when the keyword and the new keyword are the same.

20. The apparatus of claim 1, wherein the search field is configured to receive an input from the user to generate the keyword.

* * * * *